Patented Apr. 19, 1949

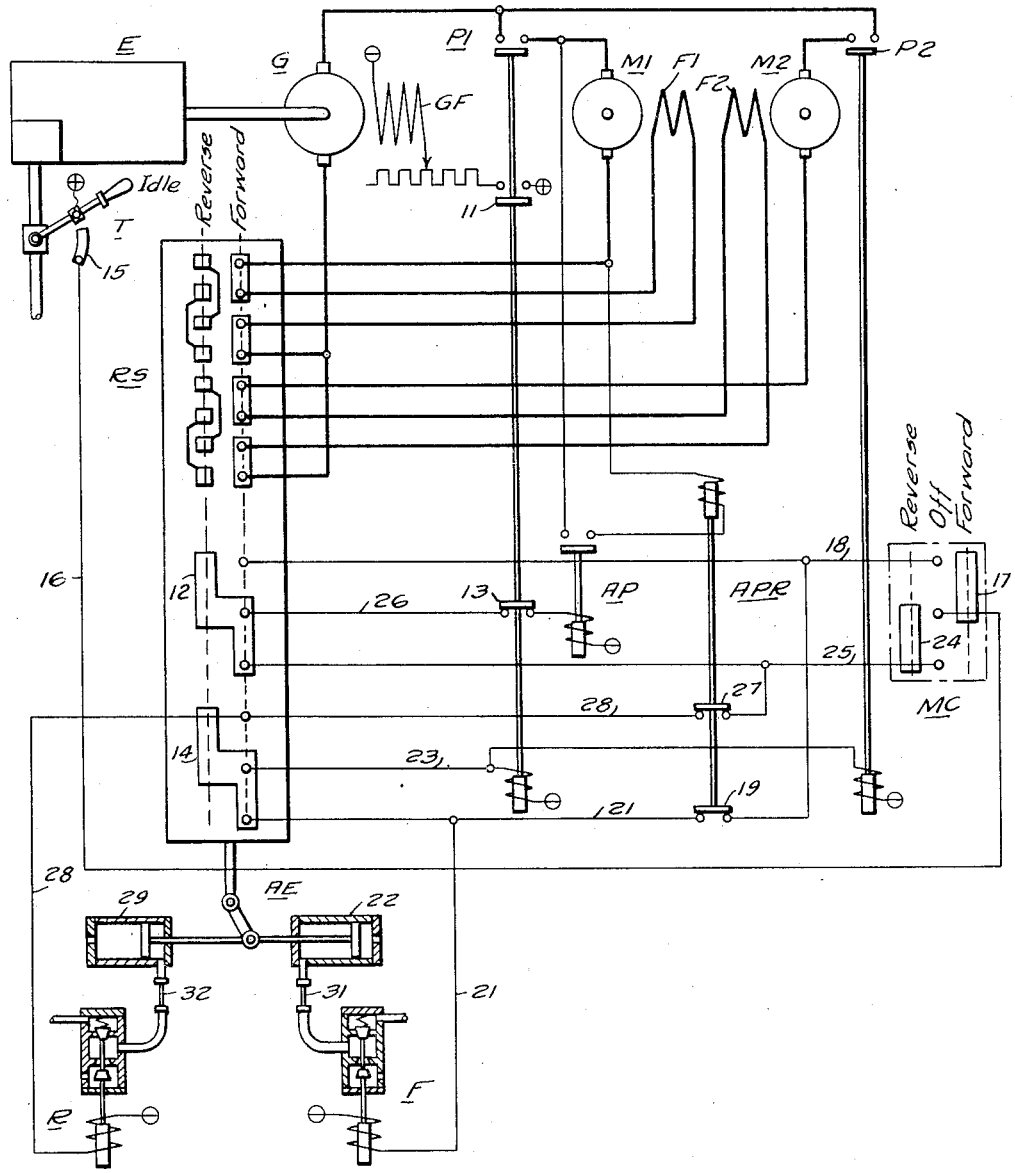

2,467,785

UNITED STATES PATENT OFFICE 2,467,785

CONTROL SYSTEM

Robert M. Strong, Penn Township, Allegheny County, Pa., assignor to Westinghouse Electric Corporation, East Pittsburgh, Pa., a corporation of Pennsylvania Application August 1, 1946, Serial No. 687,551

2 Claims. (Cl. 318—284)

My invention relates, generally, to control systems and, more particularly, to systems for controlling the operation of Diesel-electric locomotives and the like.

On most Diesel-electric locomotives which are utilized for switching purposes, the operator is able to apply power in the reverse direction before coming to a complete stop. This is known as "plugging." In the past, no effort has been made to change this feature as it provides a means of stopping the locomotive in case of emergency, even though damage to the equipment on the locomotive may result.

However, when the locomotive operators habitually utilize this method of bringing the locomotive to a stop during normal operation, it is desirable to provide anti-plugging protection in order to prevent excessive abuse of the locomotive equipment.

Accordingly, an object of my invention is to prevent plugging of an electrically-propelled locomotive.

Another object of my invention is to provide an electrical control system which prevents plugging of a locomotive or other vehicle.

A further object of my invention is to provide an anti-plugging control system which does not require mechanical speed measuring devices or direction of motion indicators.

A more general object of my invention is to provide a locomotive control system which shall be simple and efficient in operation and which may be economically manufactured and installed.

Other objects of my invention will be explained fully hereinafter or will be apparent to those skilled in the art.

In accordance with one embodiment of my invention, an anti-plugging relay, which is energized by the residual voltage of one of the traction motors of a locomotive, functions to prevent power from being applied in the reverse direction from that in which the locomotive is already moving. However, power can be reapplied in the direction the locomotive is moving and power can be applied in the reverse direction without interference from the anti-plugging relay if the locomotive is first brought to nearly a standstill.

For a better understanding of the nature and objects of my invention, reference may be had to the following detailed description, taken in conjunction with the accompanying drawing, in which the single figure is a diagrammatic view of a control system embodying the principal features of my invention.

Referring to the drawing, the system shown therein comprises a pair of motors M1 and M2, which may be of a type suitable for propelling a locomotive (not shown), a generator G for supplying current to the motors, and an engine E for driving the generator G. A throttle controller T is provided for controlling the speed of engine E in the usual manner.

As shown, the generator G is provided with a field winding GF which may be energized from a suitable source of power, such as a battery or an auxiliary generator. The motors M1 and M2 are provided with field windings F1 and F2, respectively. A reversing switch RS is provided for controlling the direction of operation of the motors by changing the connection between the armature windings and the field windings of the motors in a manner well known in the art.

The reversing switch RS may be actuated by an air engine AE having magnet valves F and R for controlling the admission of compressed air to the cylinders of the air engine. A master controller MC is provided for normally controlling the operation of the reversing switch RS.

In accordance with the usual practice, switches P1 and P2 are provided for connecting the motors M1 and M2, respectively, to the generator G. An interlock 11 is provided on the switch P1 for controlling the energization of the generator field GF.

As explained hereinbefore, it is desirable to provide protection against plugging of the motors M1 and M2, that is, applying power to the motors in the reverse direction before coming to a complete stop. In order to accomplish this result, I have provided an anti-plugging relay APR having an actuating coil disposed to be connected across the armature of the motor M1 through contact members of an auxiliary relay AP.

Thus, the relay APR is responsive to the residual voltage of the motor M1 when the motor is disconnected from the generator G. The contact members of the relay APR are so connected in the control circuit that the motors cannot be reversed while the locomotive is still moving above a predetermined speed. However, the operator can reapply power to the motors in the direction the locomotive is already moving at any time and power can be applied in the reverse direction without interference from the anti-plugging relay after the locomotive is first brought to nearly a standstill.

As previously explained, the actuating coil APR is connected across the armature winding of the motor M1 through contact members of the relay AP. The energization of the actuating coil of the relay AP is controlled by an interlock 12 on the reversing switch RS in co-operation with an interlock 13 on the switch P1'. An interlock 14 is also provided on the reversing switch RS for controlling the energization of the actuating coils P1 and P2 in cooperation with the master controller MC and a switch 15 on the throttle controller T.

In order that the functioning of the foregoing apparatus may be more clearly understood, the operation of the system will now be described in more detail. Assuming that it is desired to operate the locomotive in the forward direction, the master controller MC is actuated to the "Forward" position.

When the throttle switch 15 is closed, a circuit is established for the magnet valve F of the reversing switch RS which extends from positive through the switch 15, conductor 16, contact members 17 of the controller MC, conductor 18, contact members 19 of the relay APR, conductor 21, and the actuating coil of the magnet valve F to negative. The energization of the magnet valve F admits compressed air to a cylinder 22 on the air engine AE, thereby actuating the reversing switch RS to the "Forward" position in case it is not already in that position.

At this time, the switches P1' and P2 are closed. Their actuating coils are energized through a circuit which extends from the conductor 21, through the interlock 14 on the reversing switch RS, conductor 23, and thence through the actuating coils of the switches P1 and P2 to negative.

As explained hereinbefore, under normal conditions of operation the operator should bring the locomotive to a complete stop by returning the throttle T to the idling position, and applying the brakes before attempting to reverse the locomotive. If, however, the operator attempts to reverse the locomotive while it is still moving, the coil of the anti-plugging relay APR is connected across the armature of the motor 1 by the closing of the contact members of the relay AP which is energized through cross-connected interlocks of the reversing switch RS and the controller MC.

Thus, assuming that the master controller MC is actuated to the "Reverse" position and the throttle switch 15 is closed, the actuating coil of the relay AP is energized through a circuit which extends from the conductor 16, through contact member 24 of the controller MC, conductor 25, the interlock 12 on the reversing switch RS, conductor 26, the interlock 13 on the switch P1, and the actuating coil of the relay AP to negative.

The relay APR is energized by the residual voltage of the motor M1 and the opening of its contact members 27 opens the circuit to the magnet valve R of the reversing switch RS. It will be noted that the switches P1 and P2 were opened to disconnect the motors from the generator when the throttle T was actuated to the "Idle" position. Therefore, the motors are disconnected from the generator and, since the energization of the generator field GF is controlled by the interlock 11 on the switch P1, the generator voltage remains essentially zero.

When the locomotive slows down sufficiently to permit the relay APR to close its contact members, power may be applied to the motors in the reverse direction by opening the throttle T, thereby closing the throttle switch 15. In this manner the magnet valve R is energized through a circuit which extends from a conductor 25, through contact members 27 of the relay APR, conductor 28, and the actuating coil of the magnet valve R to negative.

Thus, compressed air is admitted to a cylinder 29 on the air engine AE to actuate the reversing switch RS to the "Reverse" position. Following the operation of the reversing switch, the switches P1' and P2 are reclosed by the energization of their actuating coils through a circuit extending from the conductor 28, through the interlock 14 to the conductor 23, and thence through the actuating coils of the switches P1 and P2.

It will be noted that the relay APR does not function to restrain the operator until he opens the throttle T with the master controller MC set for reversal of direction. Thus, it is entirely permissible to move the controller MC to a "Reverse" position, provided the throttle T is not opened to close the switch 15 until the locomotive is slowed down to nearly a standstill.

To function properly, the auxiliary relay AP and the anti-plugging relay APR must both operate sufficiently fast to open the circuits for the magnet coils of the reversing switch before the reversing switch moves far enough to open the circuit for the coil of the relay AP which is established through the interlock 12 on the reversing switch. In the event that it becomes necessary to slow down the operation of the reversing switch to permit the proper functioning of the relays AP and APR, this may be accomplished by providing chokes or restrictions 31 and 32 in the air lines between the magnet valves F and R and the cylinders 22 and 29, respectively.

In case the locomotive is operating in the reverse direction and the operator attempts to actuate the reversing switch to the "Forward" position before the locomotive comes to a standstill, the system functions in a manner similar to that herein described to prevent the reversing switch from being operated until the locomotive is nearly at a standstill. Thus, the system functions for both directions of travel of the locomotive.

From the foregoing description, it is apparent that I have devised a system which provides anti-plugging protection for a Diesel-electric locomotive or other electrically propelled vehicle. The system is simple in operation and requires a relatively small amount of equipment in addition to that usually supplied on an electric locomotive.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a control system, in combination, a motor, a generator for supplying current to the motor, switching means for connecting the motor to the generator, reversing means for the motor, a controller for normally controlling the operation of said reversing means, relay means responsive to the residual voltage of the motor for preventing operation of said reversing means under predetermined conditions, an auxiliary relay for controlling the energization of said relay means, interlocking means on said reversing means, and interlocking means on said switching means co-operating with said interlocking means on the reversing means and said controller in controlling the energization of said auxiliary relay.

2. In a control system, in combination, a motor, a generator for supplying current to the motor, switching means for connecting the motor to the generator, reversing means for the motor, a controller for normally controlling the operation of said reversing means, relay means responsive to the residual voltage of the motor for preventing operation of said reversing means under predetermined conditions, an auxiliary relay for controlling the energization of said relay means, interlocking means on said reversing means, interlocking means on said switching means cooperating with said interlocking means on the reversing means and said controller in controlling the energization of said auxiliary relay, and additional interlocking means on the reversing means for controlling the operation of said switching means.

ROBERT M. STRONG.

REFERENCES CITED

The following references are of record in the file of this patent:

UNITED STATES PATENTS

| Number | Name | Date |
| --- | --- | --- |
| 1,043,799 | Brobst | Nov. 12, 1912 |
| 1,245,194 | Crabbe | Nov. 6, 1917 |
| 1,489,493 | Gwynn et al. | Apr. 8, 1924 |
| 2,378,785 | Ogden | June 19, 1945 |
| 2,394,111 | Schaelchlin et al. | Feb. 5, 1946 |